Dec. 18, 1956     M. DOMENECH     2,774,291
FILM PROCESSING HANGER
Filed March 5, 1954     2 Sheets-Sheet 1
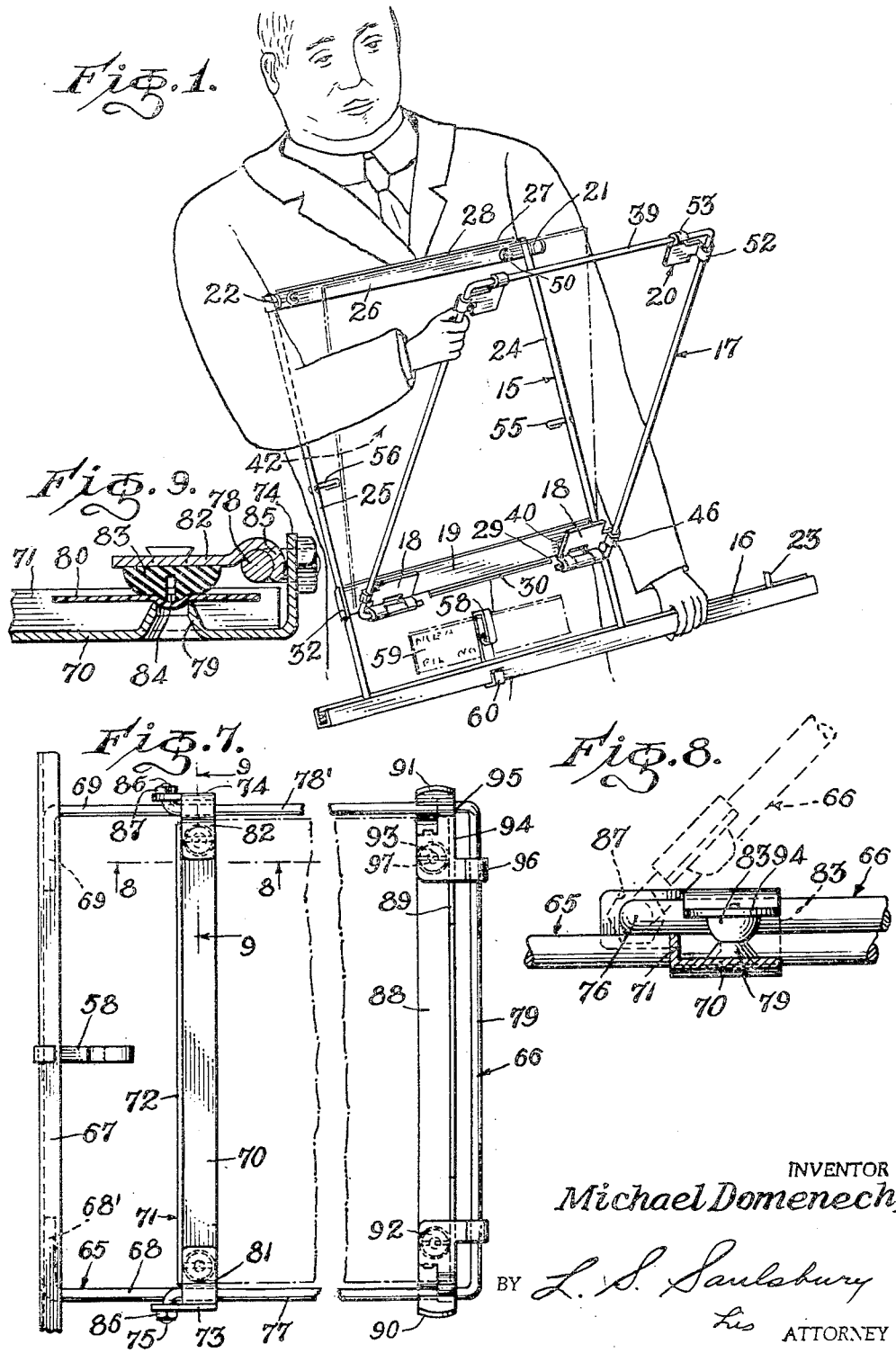
INVENTOR
Michael Domenech,
BY L. S. Saulsbury
ATTORNEY

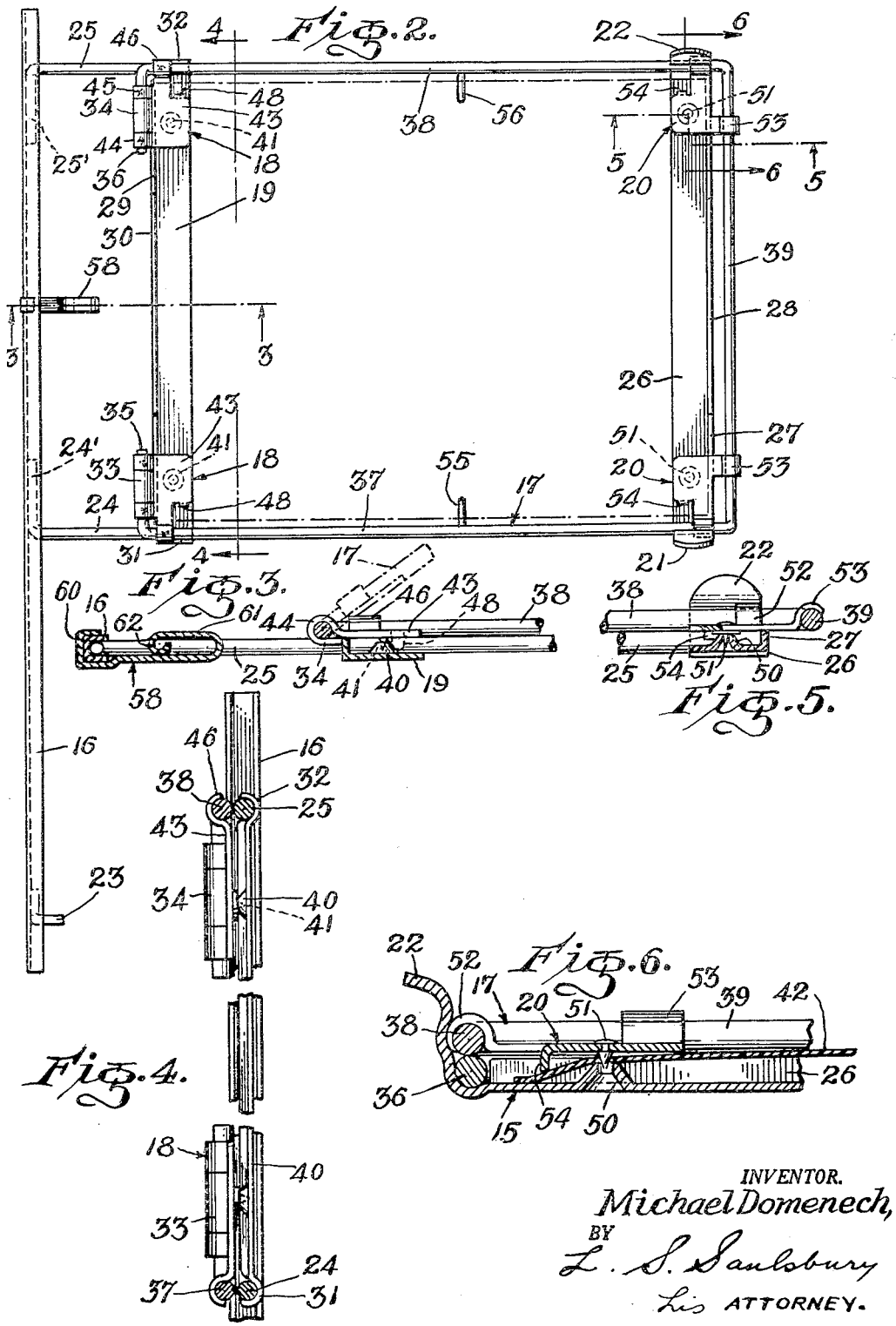

United States Patent Office 2,774,291
Patented Dec. 18, 1956

2,774,291

FILM PROCESSING HANGER

Michael Domenech, Newark, N. J., assignor of twenty-five percent to Samuel Jules Lustig, East Orange, N. J.

Application March 5, 1954, Serial No. 414,313

5 Claims. (Cl. 95—100)

This invention relates to a film processing hanger.

It is an object of the present invention to provide a film processing hanger wherein the film is retained at the corners thereof and is tightened and positively locked in place as a hinged frame is brought downwardly over the backing frame and onto the film.

It is another object of the invention to provide a film processing hanger into which the film can be placed while holding the hanger in mid-air and against the body and without the necessity of having to place the hanger upon a flat surface for the purpose of placing the film into it and thereby to make easy the handling of these hangers and the films to be placed in them.

It is another object of the invention to provide a film processing hanger wherein the frame parts are open so as not to interfere with the side edges of the film and so that the films upon being developed, washed, fixed or dried will be processed upon every part of the film surface and wherein the film is held in suspension between the frame parts.

It is another object of the invention to provide a film processing hanger wherein the wire portions of the hinged frame are so bent and connected to the main frame that they serve as the hinge pins and are held in hinge sleeve parts of the main frame and thereby makes for a simple construction of the hanger about the hinge connection of the hinge part to the main part, the hinge frame being of U-shape with the ends of the legs being turned inwardly or outwardly to serve as the hinge pins and for making the connection with the main hinge part.

It is another object of the invention to provide a simple and positive locking means for the securement of the corners of the film, and in which the corners of the film are drawn over the locking support to tighten the film between the sides thereof and before the projections of the locking parts finally positively secure the corners of the film within the hanger.

Other objects of the invention are to provide a film processing hanger having the above objects in mind, which is of simple construction, inexpensive to manufacture, has a minimum number of parts, easy to operate, light in weight, requires minimum material, open, durable and rugged and will withstand continued use, effective and efficient in operation.

For a better understanding of the invention, reference may be had to the following detailed description taken in connection with the accompanying drawing, in which:

Figure 1 is a perspective view of the film processing hanger constructed according to one form of the invention and with illustration being made as to the manner in which the hanger is held against the body while inserting a film to be processed;

Fig. 2 is a front elevational view of the hanger shown in Fig. 1;

Fig. 3 is an enlarged fragmentary vertical sectional view taken on line 3—3 of Fig. 2;

Fig. 4 is an enlarged fragmentary transverse sectional view taken on line 4—4 of Fig. 2;

Fig. 5 is an enlarged fragmentary sectional view taken on line 5—5 of Fig. 2;

Fig. 6 is an enlarged transverse sectional view taken on line 6—6 of Fig. 2;

Fig. 7 is a fragmentary front elevational view of a modified form of the invention;

Fig. 8 is an enlarged fragmentary sectional view taken on line 8—8 of Fig. 7;

Fig. 9 is a fragmentary transverse sectional view taken on line 9—9 of Fig. 7.

Referring now particularly to the form of the invention shown in Figs. 1 to 6, 15 represents a main frame that is suspended by the hanger strip 16 of channel section and a hinged frame 17 hingedly connected by a hinge and film fastening arrangement shown generally at 18 to a transverse member 19 of the main frame 15 and which has a tightening and locking arrangement 20 upon the hinge frame 17 being united at its lower end with the lower end of the main frame and locked in place on the main frame by expandible spring fastening means 21 and 22 located respectively at the opposite sides of the main frame 15.

The main frame 15 is made up of the channel strip 16 that supports the hanger with its film in a processing tank or rack and has a projection 23 engageable with the tank or rack to hold the film hanger against lateral displacement when disposed therein, two laterally spaced parallel rod members 24 and 25 secured at their upper ends into the channel strip by having their ends respectively inwardly bent as indicated respectively at 24' and 25' and welded or otherwise suitably secured therein at the proper spaced relationship for the support of a given size film between them. The lower ends of the rods 24 and 25 are held together by a transverse strip 26 having an upturned lower edge 27 that is preferably relieved by a long recess 28 and which has its ends turned up as respectively indicated at 21 and 22, aforementioned, and which are sprung outwardly as the sides of the hinge frame 17 are pressed downwardly against the film and the main part. In this manner the hinge frame is frictionally and securely held in place upon the film and against the main frame 15, the turned up ends 21 and 22 are welded or otherwise securely fastened to the round rods 24 and 25.

The transverse member 19 has an edge 29 that is similarly recessed or relieved at 30 to allow for a free flow of liquid through the hanger and has its ends rolled or turned about the sides of the rods 24 and 25 as indicated respectively at 31 and 32 and welded or otherwise suitably secured to the respective rods.

The transverse member 19 has at the opposite sides thereof and along the turned up edge 29 sleeve hinge connections 33 and 34 for respectively receiving inwardly turned ends 35 and 36 of opposite leg portions 37 and 38 of the U-shaped hinged frame 17. These leg portions 37 and 38 are joined by a bight portion 39, at the lower end of the frame.

The combined tightening, locking and hinge arrangement, as indicated generally at 18, further includes on the transverse member 19 and at the opposite sides thereof, one for each arrangement 18, upwardly struck and open film supporting projections or mounds 40, open at the center to receive a fastening pin 41 that perforates the corner of the film illustrated by dot and dash lines at 42 and in full lines in Fig. 6. This pin projection 41 is secured to, or may be struck from, a plate member 43 secured to the leg portion of the hinged frame member 17 by rounded projections 44 and 45 surrounding the inwardly bent end of the leg portion that serves as the hinge connection for the hinge frame upon the transverse member 19 of the main frame and a laterally extending rounded projection 46 that extends about the leg portion itself at the side thereof. These projections 44 and 45 as well as 46 are each welded to the leg portion of the hinge frame so as to be positively moved therewith and so as to positively hold the leg portion at its turned end 35 or 36 against removal from the hinge sleeve 33 or 34 of the transverse member or support 19. On each plate 43 is a tightening down projection 48 that engages the base of the film tightly downwardly over the support or mound 40 prior to the penetration of the pin projection 41 through the film and into the opening of the mound 40. Upon both sides of the film being tightened down simultaneously and then positively locked by the pin projections upon the mounds, the edge of the film at the top thereof will be held tight and tensioned above the face of the transverse member 19 and spaced therefrom to allow for a free flow of liquid under the film and between the film and the top face of the transverse member 19.

It should now thus be apparent that there has been provided a unique and simple hinge connection with which there has been combined a simple tightening down and positive locking means for the film.

The transverse member 26 at the lower end of the main frame is similarly provided with struck up open projections or mounds 50, Fig. 5 and Fig. 6, adapted to respectively receive depending pin projections 51 of the pulled down plates 20 of the hinge frame 17 and which are respectively secured to the respective leg portions and to the bight portion of the U-shaped hinge frame by rounded or rolled projections 52 and 53 so as to positively lock the plates against displacement along the portions of the U-shaped frame. These projections are respectively secured by welding to the rod portions of the frame. The bight portion 39 will project downwardly from the turned up edge 27 of the support 26 when the hinge frame 17 is closed upon the film and the main frame.

Each plate 20 has a downwardly struck projection 54 that will engage the surface of the film 42 as best illustrated in Fig. 6 to pull the corner of the film tightly over the mound 50 just prior to the engagement and penetration of the pin projection 51 with the film. These projections 54 work in cooperation with the projections 48 of the arrangements 18 so that the film not only will be tensioned across its upper and lower edges but will also be tensioned both ways, as the hinge frame 17 is brought downwardly upon the film and the main frame.

The support to the sides of the film is provided at the respective sides by respective projections 55 and 56 extending inwardly from the respective side portions 24 and 25 of the main frame 15. As illustrated in Fig. 1, this makes possible the easy insertion of the film 42 on the main frame while the hanger is being held by the attendant placing the film into the hanger.

The side edges are accordingly given support intermediate their length thereof so that the film cannot readily slip through the opening in the main frame 15 and will be adequately supported by its upper and lower edges along the respective transverse supports 19 and 26. This makes possible the easy filling of the hangers and saves time for the attendant having to locate the hanger upon a flat surface merely for the purpose of filling the same with the film. Once the film is made tight in the hanger, the supports 55 and 56 will still prevent the collapse of the film through the main frame but will not be dependent entirely for this purpose as the frames will securely hold the film between the pin projections of the hinge frame 17. These projections 55 and 56 are small and will not interfere to any great extent in the processing of the film.

On the channel strip 16 at the top of the hanger and depending from the same into the space between the transversely spaced rods 19 or 26 is a clip 58 serving to support a tag or marker 59. This clip is easily accessible and the marker can quickly and easily be placed upon the clip or removed therefrom. This clip is made of bent spring strip that can be sprung over the sides of the channel strip 16 in the manner indicated at 60 and which has a turned up portion 61 with a rolled end 62 that will engage the face of the marker 59 and hold it in place within the clip.

Referring now particularly to the form of the invention shown in Figs. 7 and 8, there is shown a somewhat similar construction, but different in details. This form of hanger comprises generally a main frame 65 and a hinged frame 66. The main frame 65 is formed with a hanger strip 67, side rod portions 68 and 69 rigidly secured to the hanger strip in the manner above mentioned in the previous form of the invention and by their respective inwardly bent ends 68' and 69'. A transverse member 70 is extended between the rods, and it has upwardly extending reinforced edge 71 that may be recessed at 72 to permit the free flow of liquid thereover and which has respectively at the opposite ends thereof bent up projections 73 and 74, serving respectively as hinge supports for respective outwardly bent ends 75 and 76 of respective leg portions 77 and 78 of the U-shaped hinged frame 66 and which are joined by a bight portion 79. At the opposite ends of the transverse member 70 are upwardly projected open mounds or film supporting projections 79 against which film 80 is pressed to secure the film between the frames. The U-shaped hinged frame 66 has on its respective leg portions 77 and 78 inwardly extending plates 81 and 82. Each plate has secured to its underface a rubber button 83 with a pin projection 84 depending from the center thereof and adapted to register with the opening in the mound 79 and serve to deform and pull into the opening within the mound 79 the corner of the film and thereby tension the film along its upper and lower side edges as well as along the edges when the similar projection is used in the U-shaped hanger frame in a manner to be presently described. The plates 81 and 82 are secured to the leg portions just below the ends 75 and 76 by rolled over portions 85 welded to the leg portions 77 or 78. The bent ends 75 and 76 are retained against inward displacement from the hinge supports 73 and 74 by respective nuts 86 and 87 lying respectively outwardly of the supports and fixedly secured to the respective bent ends of the leg portions.

The side rod portions 68 and 69 are held at their lower ends in spaced relationship by a transverse support 88 having a recessed turned up bottom edge 89 and turned up respective spring or expandible outer ends 90 and 91 adapted to spring fit and frictionally engage the lower ends of the leg portions 77 and 78 in the manner described in connection with the first form of the invention.

The opposite ends of the support 88 are upwardly struck open mounds 92 and 93 lying respectively adjacent the respective portions 68 and 69 of the main frame.

Secured between the respective leg portions 77 and 78 and the bight portion 79 and in each of the lower corners of the hinged frame 66 is a plate 94 similar to the plate 20 above described and secured by a projection 95 rolled over the leg portions 77 or 78 of the U-shaped hinge frame 66 and a projection 96 hinged over the bight portion 79 of the U-shaped frame 66. This plate 94 carries a rubber button 97 with a central pin projection similar to the button 83 and the projection 84 above described and will so engage the mound 92 or mound 93 as to pull the corner of the film 80 over the mound and to tension the lower edge and as well the side edges of the film.

It should be apparent that with this form of the invention the film can be placed upon the hanger when the hanger is held by the attendant in the manner shown in Fig. 1 and without the hanger being placed on a flat surface and that the film will be supported by inward projections on the main frame while being placed in the hanger and while the hinged frame is being closed upon the main frame and that as the projections are brought into engagement with the film, the film is brought tight to be supported upon the mounds and finally the film is positively locked at its corners thereof and held tensioned along its edges and spaced from the transverse supports upwardly so that the liquid can freely pass the edges of the film when the film is being processed and so that the film liquid practically reaches all surfaces of the film.

While various changes may be made in the detail construction, it shall be understood that such changes shall be within the spirit and scope of the present invention as defined by the appended claims.

What is claimed is:

1. A film processing hanger comprising a main frame having a channel section hanger member, two laterally spaced parallel rod members secured to said hanger member and depending downwardly therefrom, a lower transverse member connected between the lower ends of said rod members, said lower transverse member having an upturned lower edge and turned up flexible ends secured to the outer side of said rods, and an intermediate transverse member connected between said rods, said intermediate transverse member having an upturned upper edge, and end portions rolled about said rods and secured thereto, a U-shaped frame having leg portions with their free ends inwardly bent, sleeve hinge connections affixed to the intermediate transverse member and receiving said inwardly bent ends, means for preventing lateral displacement of said U-shaped frame relative to said hinge members, and means for tightly holding film in said frame, said holding means including raised mounds, provided with openings, adjacent each corner of the main frame and pin members at each corner of the U-shaped frame adapted to enter the openings in said raised mounds.

2. A film processing hanger as defined in claim 1, and pin projections extending inwardly from the respective side rod members of the main frame intermediate the length thereof and intermediate the transverse members whereby to support the film transversely of its length and to facilitate the insertion of the film into the hanger.

3. A film processing hanger as defined in claim 1 and said holding means further including plates having projections secured about the bent ends of the leg portions and against and about the leg portions, other plates secured to the corners of the closed end of the hinged U-shaped frame, said transverse members having the raised mounds and said plates having the pin members thereon engageable with said mounds as the hinged U-shaped frame is closed upon the main frame.

4. A film processing hanger, as defined in claim 3, and each of said plates having a separate projection offset from the projection entering the mound and adapted to bend down the film at the corner over the mound and to tighten the same along its edges as the hinge frame is brought into clamping engagement with the main frame to secure the film therebetween whereby to hold the edges of the film in tight tensioned engagement above the faces of the transverse member.

5. A film processing hanger as defined in claim 3, and a rounded rubber button surrounding each pin member adapted to force the film into the opening of the mound and to pull the film at its corner from all directions.

References Cited in the file of this patent

UNITED STATES PATENTS

| | | |
|---|---|---|
| 1,405,892 | Berger | Feb. 7, 1922 |
| 1,508,947 | Allen | Sept. 16, 1924 |
| 1,572,337 | Wachter | Feb. 9, 1926 |
| 1,825,310 | Engstrom | Sept. 29, 1931 |
| 1,854,931 | Gollomb | Apr. 19, 1932 |
| 2,410,131 | Sardeson et al. | Oct. 29, 1946 |